United States Patent [19]

Tatsuma et al.

[11] Patent Number: 6,146,430

[45] Date of Patent: Nov. 14, 2000

[54] ASYMMETRIC DIOXAZINE COMPOUND AND METHOD FOR DYEING OR PRINTING FIBER MATERIAL USING THE SAME

[75] Inventors: Masahiko Tatsuma, Ibaraki; Junichi Sekihachi, Toyonaka, both of Japan

[73] Assignee: Sumitomo Chemical Company, Limited, Osaka, Japan

[21] Appl. No.: 09/220,008

[22] Filed: Dec. 23, 1998

[30] Foreign Application Priority Data

Dec. 25, 1997 [JP] Japan ................................ 9-357886

[51] Int. Cl.⁷ .................................................. C07D 498/04
[52] U.S. Cl. ................................................. 8/454; 544/76
[58] Field of Search ................... 544/76; 8/454, 8/549

[56] References Cited

U.S. PATENT DOCUMENTS 5,484,458 1/1996 Russ et al. ................................. 8/549
5,837,869 11/1998 Inoue et al. ............................ 544/113

FOREIGN PATENT DOCUMENTS 539431 2/1993 Japan .
8193171 7/1996 Japan .

OTHER PUBLICATIONS

Araki et al., Chemical Abstracts, vol. 128, abstract 116243, 1998.

Primary Examiner—Richard L. Raymond

Attorney, Agent, or Firm—Stevens, Davis, Miller & Mosher, L.L.P.

[57] ABSTRACT

An asymmetric dioxazine compound represented by the following formula (I):

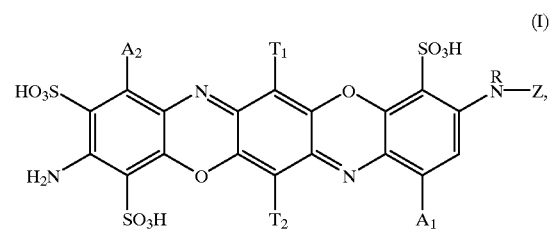

wherein $T_1$ and $T_2$ represents hydrogen, alkyl, etc.;

$A_1$ represents alkyl, etc.;

$A_2$ represents hydrogen, alkyl, etc.;

R represents hydrogen, alkyl, etc.; and

Z represents a pyrimidine-based or quinoxaline-based fiber reactive group, or a triazine-based fiber reactive group and the triazine-based fiber reactive group may have halogen and/or $-SO_2-CH=CH_2$ or $-SO_2CH_2CH_2Z_2'$ ($Z_2'$ represents a group which is released by the action of an alkali).

12 Claims, No Drawings

ASYMMETRIC DIOXAZINE COMPOUND AND METHOD FOR DYEING OR PRINTING FIBER MATERIAL USING THE SAME

BACKGROUND OF THE INVENTION

The present invention relates to an improved novel dioxazine compound which is suitable for dyeing and printing a material containing a hydroxyl group and/or an amide group, particularly, cellulose fiber, natural or synthetic polyamide fiber, polyurethane fiber, leather or the like, and further blended yarn thereof and which enables light fast, wet fast and chlorine fast dyeing, and applications thereof.

Reactive dyes having a dioxazine skeleton in the molecular structure are known, but they are not sufficient in dyeing abilities, such as level dyeing property, build up property and dyeing speed, or in fastness, particularly chlorine fastness. Therefore, further level up thereof is desired.

Particularly, fastness of dyed or printed article of a fiber material containing a hydroxyl group and/or an amide group, more particularly chlorine fastness is not satisfactory. The present inventors have intensively studied to improve the fastness. As a result, the present inventors have found a dioxazine compound which can solve the above-described problems, and have completed the present invention.

SUMMARY OF THE INVENTION

The present invention provides an asymmetric dioxazine compound represented by the following formula (I):

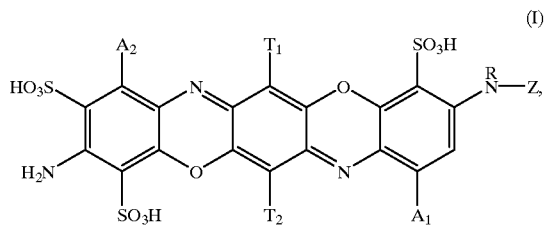

wherein $T_1$ and $T_2$ each independently represents hydrogen, chlorine, bromine, a lower alkyl group, a lower alkoxy group or a phenoxy group;

$A_1$ represents a lower alkyl group, a lower alkoxy group, chlorine, bromine or a carboxyl group;

$A_2$ represents hydrogen, a lower alkyl group, a lower alkoxy group, chlorine, bromine or a carboxyl group;

R represents hydrogen or a lower alkyl group which may be optionally substituted; and Z represents a pyrimidine-based or quinoxaline-based fiber reactive group, or a triazine-based fiber reactive group selected from groups represented by the following formulae (II) to (V):

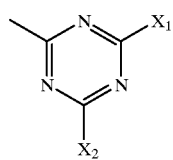

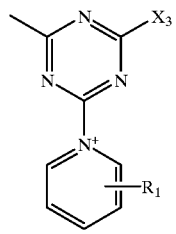

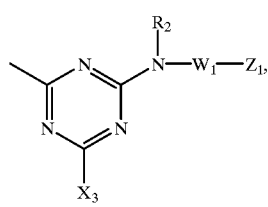

wherein, $X_1$ represents halogen or a group represented by the following formula (VI):

$$-N(R_3)-W_2-Z_2 \quad (VI)$$

wherein, $W_2$ represents a lower alkylene group which may be optionally substituted and may be interrupted by a hetero atom, a phenylene group which may be optionally substituted or a naphthylene group which may be optionally substituted;

$Z_2$ represents $-SO_2-CH=CH_2$ or $-SO_2CH_2CH_2Z_2'$ ($Z_2'$ represents a group which is released by the action of an alkali); and $R_3$ represents hydrogen or a lower alkyl group which may be optionally substituted;

$X_2$ represents a halogen, OH, $OR_4$, SH, $SR_4$, $SO_2R_4$ ($R_4$ represents a lower alkyl group which may be optionally substituted or a phenyl group which may be optionally substituted) or $SO_3H$, provided that, when $X_1$ represents a group represented by the formula (VI), $X_2$ represents OH, SH, $SR_4$, $SO_2R_4$ ($R_4$ has the same meaning as described above), $SO_3H$ or a phenoxy group which may be optionally substituted, and $X_1$ and $X_2$ are not simultaneously halogen;

$R_1$ represents hydrogen, a carboxyl group, a carbamoyl group, a sulfo group, halogen or a lower alkyl group which may be optionally substituted;

$W_1$ represents a lower alkylene group which may be optionally substituted and may be interrupted by a hetero atom;

$R_2$ represents a phenyl group which may be optionally substituted or $-W_3-Z_3$ {$W_3$ represents a lower alkylene group which may be optionally substituted an may be interrupted by a hetero atom, $Z_3$ represents $-SO_2-CH=CH_2$ or $-SO_2CH_2CH_2Z_3'$ ($Z_3'$ represents a group which is released by the action of an alkali)};

$Z_1$ represents —SO$_2$—CH=CH$_2$ or —SO$_2$CH$_2$CH$_2$Z$_1$'  ($Z_1$' represents a group which is released by the action of an alkali); and $X_3$ represents halogen, OH, OR$_4$, SH, SR$_4$, SO$_2$R$_4$ (R$_4$ has the same meaning as described above), SO$_3$H, an amino group which may be optionally substituted, or a group represented by the following formula (VII):

   (VII)

wherein, $W_4$ represents a lower alkylene group which may be optionally substituted and may be interrupted by a hetero atom, a phenylene group which may be optionally substituted or a naphthylene group which may be optionally substituted;

$Z_4$ represents —SO$_2$—CH=CH$_2$ or —SO$_2$CH$_2$CH$_2$Z$_4$' ($Z_4$' represents a group which is released by the action of an alkali); and $R_5$ represents hydrogen, a lower alkyl group which may be optionally substituted, a phenyl group which may be optionally substituted or —W$_5$—Z$_5$ {W$_5$ represents a lower alkylene group which may be optionally substituted and may be interrupted by a hetero atom, and Z$_5$ represents —SO$_2$—CH=CH$_2$ or —SO$_2$CH$_2$CH$_2$Z$_5$' (Z$_5$' represents a group which is released by the action of an alkali)}; and a salt thereof.

The present invention also provide a method for dyeing or printing a fiber material using this dioxazine compound.

DETAILED DESCRIPTION OF THE PREFERRED EMBODIMENTS

The lower alkyl group represented by $T_1$, $T_2$, $A_1$ or $A_2$ in the formula (I) is, for example, a straight-chain or branched-chain $C_1$ to $C_5$ alkyl group ("$C_m$ to $C_n$" indicates that the group attached to it has m to n carbon atoms.), and inter alia, a methyl group, an ethyl group and a n-propyl group are preferred. The lower alkoxy group represented by $T_1$, $T_2$, $A_1$ or $A_2$ in the formula (I) is, for example, a straight-chain or branched-chain $C_1$ to $C_5$ alkoxy group, and inter alia, a methoxy group, an ethoxy group and an n-propoxy group are preferred. As $T_1$ and $T_2$, chlorine and bromine are preferred independently each other. As $A_1$, a $C_1$ to $C_5$ alkyl group and a $C_1$ to $C_5$ alkoxy group are particularly preferred. As $A_2$, hydrogen is particularly preferred.

As the lower alkyl group which may be optionally substituted and is represented by R, $R_1$, $R_3$, $R_4$ or $R_5$, substituted or unsubstituted straight-chain or branched-chain $C_1$ to $C_5$ alkyl groups are preferred. Herein, examples of the lower alkyl group include methyl, ethyl, n-propyl, iso-propyl and n-butyl. Preferred examples of groups which may be substituted on the lower alkyl groups include hydroxy, cyano, $C_1$ to $C_5$ alkoxy, halogen, carbamoyl, carboxy, alkoxy ($C_1$ to $C_5$) carbonyl, alkyl ($C_1$ to $C_5$) carbonyloxy, sulfo and sulfamoyl. Examples of the lower alkyl group which is substituted include 2-hydroxyethyl, 2-hydroxypropyl, 3-hydroxypropyl, 3-hydroxybutyl, 4-hydroxybutyl, 2,3-dihydroxypropyl, 3,4-dihydroxybutyl, cyanomethyl, 2-cyanoethyl, 3-cyanoethyl, methoxyethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromobutyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonypropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl and 4-sulfamoylbutyl.

Examples of the phenyl group which may be optionally substituted and is represented by $R_2$, $R_4$ and $R_5$ include phenyl groups which may be optionally substituted by one or two substituents selected from $C_1$ to $C_5$ alkyl, $C_1$ to $C_5$ alkoxy, hydroxy, halogen, sulfate, carboxy and sulfo groups. Among them, an unsubstituted phenyl group and phenyl groups substituted by one $C_1$ to $C_5$ alkyl or sulfo group are particularly preferred.

As the halogen represented by $X_1$, $X_2$ or $X_3$, fluorine, chlorine and bromine are exemplified.

Examples of the substituted amino group represented by $X_3$ include alkyl($C_1$ to $C_6$)amino; N,N-dialkyl($C_1$ to $C_6$)amino; cycloalkyl($C_5$ to $C_7$)amino; aralkyl($C_7$ to $C_{10}$)amino; aryl($C_6$ to $C_{12}$)amino; mix-substituted amino groups such as N-alkyl($C_1$ to $C_6$)-N-cyclohexylamino, N-alkyl($C_1$ to $C_6$)-N-aralkyl($C_7$ to $C_{10}$)amino and N-alkyl($C_1$ to $C_6$)-N-aryl ($C_6$ to $C_{12}$)amino; amino groups substituted by an aryl group (As the aryl group, a phenyl group, naphthyl group and the like are exemplified.) which is substituted by a heterocyclic group (This heterocyclic group may be aromatic or non-aromatic, and can further have addition-condensed aromatic or non-aromatic carbocyclic ring.); and amino groups of which amino nitrogen atom is a ring member of an N-heterocyclic ring (The N-heterocyclic ring may optionally further contain oxygen, nitrogen, sulfur atom or the like.), and the like. The alkyl group as a substituent is preferably a $C_1$ to $C_5$ straight-chain or branched-chain group. The cycloalkyl group as a substituent is preferably cyclohexyl. The aralkyl group as a substituent is preferably benzyl or phenethyl. The aryl group as a substituent is preferably phenyl or naphthyl. Examples of the above-described heterocyclic group as a substituent include a residue of a heterocyclic group, such as furan, thiophene, pyrazole, pyridine, pyrimidine, quinoline, benzimidazole, benzothiazole and benzoxazole. Preferred examples of the amino groups of which amino nitrogen atom is a ring member of a N-heterocyclic ring include residues of 6-membered N-heterocyclic compounds, which may further contain an oxygen, nitrogen or sulfur atom. The above-described aryl groups and N-heterocyclic rings containing, as a substituent, a cycloalkyl group, an aralkyl group, an aryl group or a heterocyclic group, may further substituted by one, two or three substituents selected from halogen, nitro, cyano, trifluoromethyl, sulfamoyl, carbamoyl, $C_1$ to $C_4$ alkyl, $C_1$ to $C_4$ alkoxy, alkyl($C_1$ to $C_4$)carbonylamino, ureido, hydroxy, carboxy, sulfomethyl, β-sulfatoethylsulfonyl, vinylsulfonyl, β-chloroethylsulfonyl, β-hydroxyethylsulfonyl, β-hydroxyethylsulfonylethyloxy, dimethylamino, sulfo and the like. The alkyl group as a substituent may be substituted by one, two or three substituents selected from the above-described group excepting $C_1$ to $C_4$ alkyl.

More specific examples of the substituted amino group represented by $X_3$ include aliphatic amino groups substituted by straight-chain or branched-chain alkyl, such as cyanoamino, methylamino, hydroxymethylamino, ethylamino, propylamino, butylamino, β-methoxyethylamino, β-ethoxyethylamino, γ-methoxypropylamino, N,N-dimethylamino, N,N-dihydroxymethylamino, N,N-diethylamino, β-chloromethylamino, β-cyanoethylamino, N,N-di-β-hydroxyethylamino, β-hydroxyethylamino, γ-hydroxypropylamino, N-β-sulfoethyl-N-methylamino, β-carboxyethylamino and β-sulfoethylamino; cycloalkyl-substituted amino groups such as cyclohexylamino; aralkyl-substituted amino groups or aryl-substituted amino groups such as benzylamino, phenethydino, anilino, toluidino, xylidino, chloroanilino, anisidino, 2-, 3- or 4-sulfoanilino, 2,4- or 2,5-disulfoanilino, sulfomethylanilino, N-sulfomethylanilino, 3- or 4-carboxyanilino, 2-carboxy-5-sulfoanilino, 2-carboxy-4-sulfoanilino, 2-methoxy-5-sulfoanilino, 2-methyl-5-sulfoanilino, 2-methyl-4-sulfoanilino, 2-methoxy-4-sulfoanilino, 3-methoxy-4-sulfoanilino, 2,4-dimethoxyanilino, 2,4-dimethoxy-5-sulfoanilino, 4-sulfonaphthyl-(1)-amino, 3,6-disulfonaphthyl-(1)-amino, 3,6,8-trisulfonaphthyl-(1)-amino, 4,6,8-trisulfonaphthyl-(1)-amino, 6-sulfonaphthyl-(2)-amino, 4,8-disulfonaphthyl-(2)-amino, 3,6,8-trisulfonaphthyl-(2)-amino and 4,6,8-trisulfonaphthyl-(2)-amino; mix-substituted amino groups such as N-methyl-N-phenylamino, N-ethyl-N-phenylamino, N-propyl-N-phenylamino, N-butyl-N-phenylamino, N-β-cyanoethyl-N-phenylamino, N-ethyl-2-methylanilino, N-ethyl-4-methylanilino, N-ethylanilino, N-ethyl-3-sulfoanilino and N-ethyl-4-sulfoanilino; amino groups containing an aryl group having a heterocyclic group such as furan, thiophene, pyrazole, pyridine, pyrimidine, quinoline, benzimidazole, benzothiazole and benzoxazole; residues of which amino nitrogen atom is a ring member of a 6-membered N-heterocyclic ring, such as carboxypyridinio, carbamoylpyridinio, morpholino, piperidino and piperazino.

Particularly preferred examples of the amino group which may be optionally substituted and is represented by $X_3$ include an unsubstituted amino group, and substituted amino groups such as methylamino, hydroxymethylamino, ethylamino, 3-hydroxyethylamino, N,N-di-β-hydroxyethylamino, cyclohexylamino, N-methyl-N-phenylamino, N-ethyl-N-phenylamino, N-ethyl-2-methylanilino, N-ethyl-4-methyanilino, N-ethyl-3-sulfoanilino, N-ethyl-4-sulfoanilino, anilino, toluidino, xylidino, chloroanilino, anisidino, phenethydino, 2-, 3- or 4-sulfoanilino, 2,4- or 2,5-disulfoanilino, 2-methoxy-5-sulfoanilino, 2-methyl-5-sulfoanilino, 3,6-disulfonaphthyl-(1)-amino, 3,6,8-trisulfonaphthyl-(1)-amino, 4,8-disulfonaphthyl-(2)-amino, 3,6,8-trisulfonaphthyl-(2)-amino, pyridyl-(2)-amino, 3- or 4-carboxypyridinio, 3- or 4-carbamoylpyridinio, morpholino, piperidino, piperazino, N-β-sulfoethyl-N-methylamino, β-carboxyethylamino and β-sulfoethylamino.

Examples of the lower alkylene group which may be optionally substituted, may be interrupted by a hetero atom and is represented by $W_1$, $W_2$, $W_3$, $W_4$ and $W_5$ include a straight-chain or branched-chain $C_1$ to $C_6$ alkylene. Examples of the hetero atom include a sulfur atom, an oxygen atom or a nitrogen atom. Particularly preferable examples of the lower alkylene group include —$(CH_2)_2$—, —$(CH_2)_3$— and —$(CH_2)_2O(CH_2)_2$—.

As the phenylene group or naphthylene group which may be optionally substituted, phenylene groups which may be substituted by one or two substituents selected from the group consisting of methyl, ethyl, methoxy, ethoxy, chlorine, bromine and sulfo or naphthylene groups which may be optionally substituted by one sulfo group are preferred. Examples of the preferred phenylene or naphthylene groups include following groups:

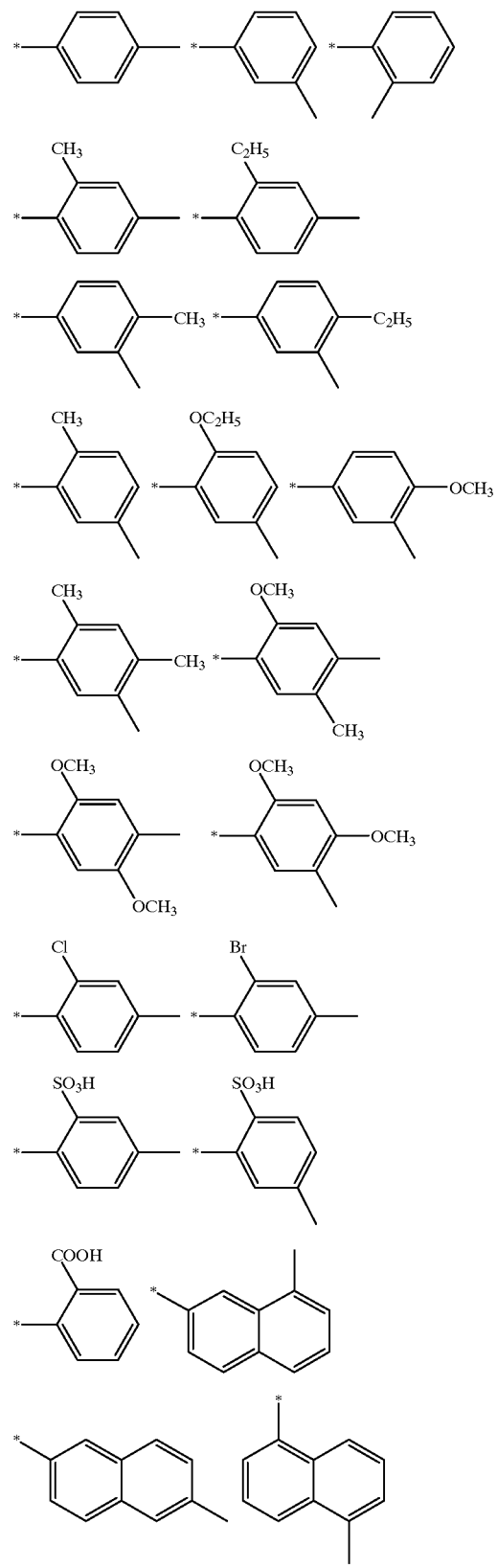

-continued

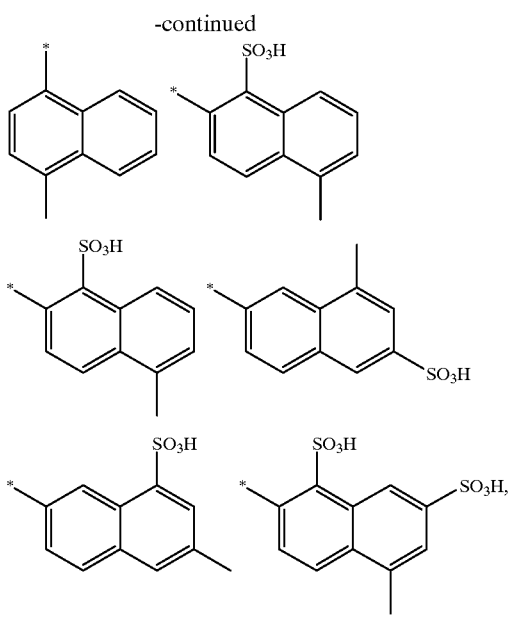

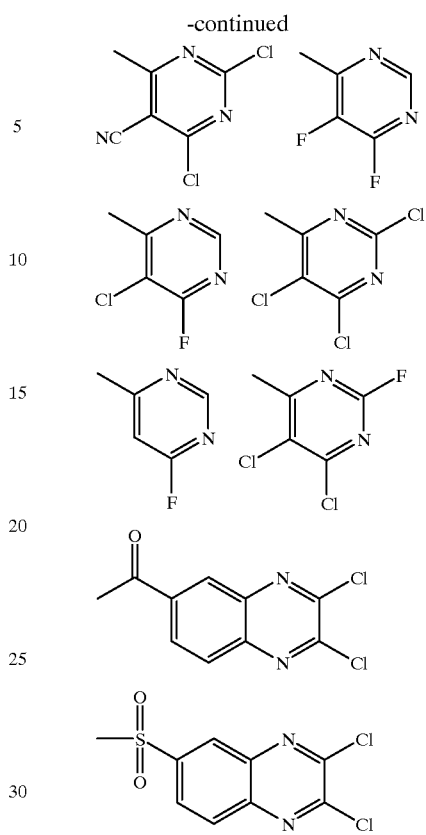

wherein, the bond indicated by * means a bond connected to a nitrogen atom. Among other, the following groups are particularly preferred:

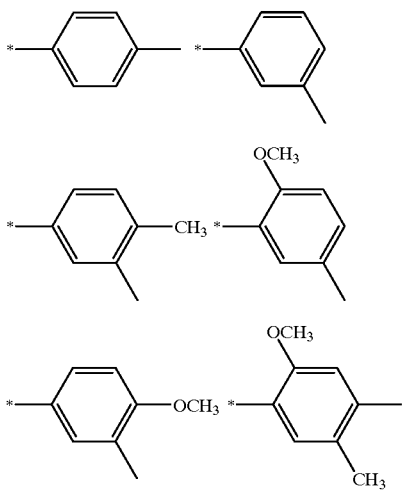

Examples of the pyrimidine-based or quinoxaline-based fiber reactive group represented by Z include following groups:

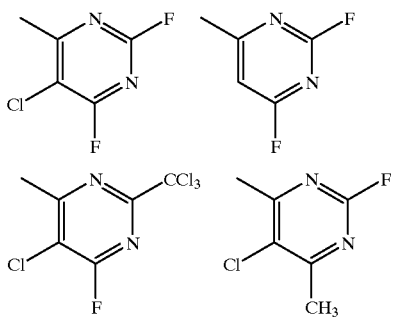

Examples of the groups represented by $Z_1'$, $Z_2'$, $Z_3'$, $Z_4'$ or $Z_5'$, which is released by the action of an alkali, include sulfates, thiosulfates, phosphates, acetates and halogens. Among them, sulfates are particularly preferred.

The asymmetric dioxazine compound of the present invention may be a compound represented by the formula (I), that is, a free acid, or may be a salt thereof. Particularly alkali metal salts and alkaline earth metal salts, inter alia sodium salts, potassium salts and lithium salts, are preferred.

As the asymmetric dioxazine compound of the present invention, a compound represented by the formula (Ia):

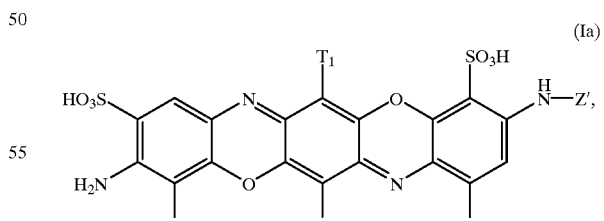

(Ia)

wherein, $T_1$ and $T_2$ each independently represents a chlorine atom or a bromine atom, $A_3$ represents a $C_1$ to $C_4$ alkyl group or a $C_1$ to $C_4$ alkoxy group, and Z' represents a pyrimidine-based fiber reactive group or triazine-based fiber reactive group represented by the following formula (III) or (IVa):

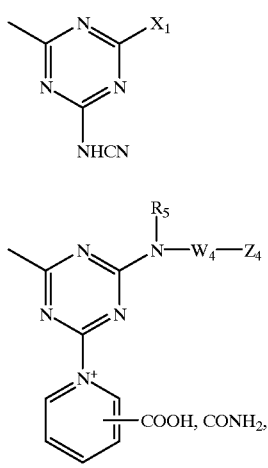

(III)

(IVa)

wherein, $X_1$, $R_5$, $W_4$ and $Z_4$ have the same meanings as described above;
and a salt thereof
are particularly preferred.

The dioxazine compound of the present invention can be produced according to a known method.

When Z represents a group represented by one of the formulae (II), (III), (IV) and (V), the asymmetric dioxazine compounds of the present invention can be produced, for example, according to a description in JP-A-9-202788, by condensing a dioxazine base represented by the formula (VIII),

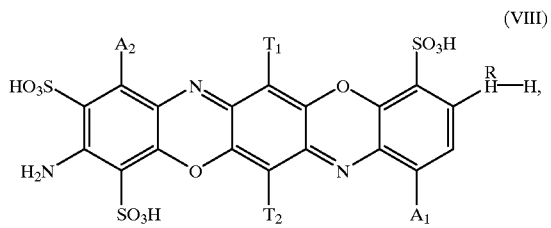

(VIII)

wherein, $T_1$, $T_2$, R, $A_1$ and $A_2$ have the same meaning as described above,
a compound of the formula (IX):

 (IX)

wherein X' has the same meaning as $X_1$ or $X_3$ described above excepting halogen,
a compound of the general formula (X):

 (X)

wherein Y' has the same meaning as $X_2$ described above excepting halogen or represents HNCN,
or a group represented by the formula (XI):

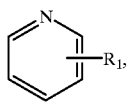 (XI)

wherein $R_1$ has the same meaning as described above with 2,4,6-trihalogeno-s-triazine according to an optional order.

The compounds of formula (I) having β-hydroxylethylsulfonyl group($-SO_2CH_2CH_2OH$) can be produced by obtaining an intermediate by the condensation reaction with 2,4,6-trihalogeno-s-triazine described above, then, drying the intermediate, followed by treating the dried intermediate in concentrated sulfuric acid so that a corresponding sulfate ester is produced.

In the above described condensation with 2,4,6-trihalogeno-s-triazine, the order of the reaction is not particularly limited. Although the reaction condition is also not particularly limited, the first condensation is preferably carried out at a temperature of $-10°$ C. to $40°$ C. and a pH of 2 to 9, the second condensation is preferably carried out at a temperature of $0°$ C. to $70°$ C. and a pH of 2 to 9, and the third condensation is preferably carried out at a temperature of $10°$ C. to $100°$ C. and a pH of 2 to 7.

When Z represents a pyrimidine-based or quinoxaline-based fiber reactive group, the asymmetric dioxazine compounds of the present invention can be produced by condensing a dioxazine base represented by the formula(VII) with a compound represented by the formula(XII):

 (XII)

wherein, $X_4$ represents halogen and Z' represents a pyrimidine-based or quinoxaline-based fiber reactive group, in the presence of a de-hydrogen halide agent.

The dioxazine base of formula (VIII) can be produced according to a known method. For example, it can be produced, according to a method disclosed in JP-A-9-202788, by condensing 1,4-benzoquinone represented by the formula (XIII):

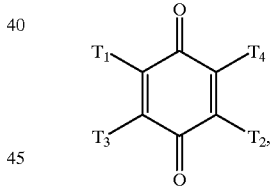 (XIII)

wherein, $T_1$ and $T_2$ have the same meaning as described above, and $T_3$ and $T_4$ represent halogen,
with a diaminobenzene compound represented by the formula(XIV):

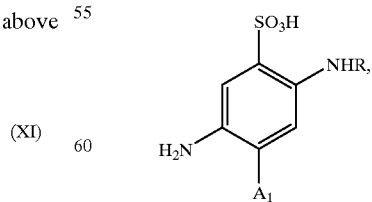 (XIV)

wherein, R and $A_1$ have the same meaning as described above, and a diaminobenzene compound represented by the formula(XV):

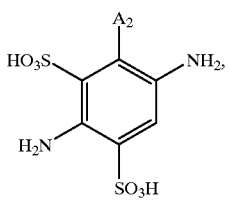
(XV)

wherein, $A_2$ has the same meaning as described above, to obtain a dianilide compound represented by the formula (XVI):

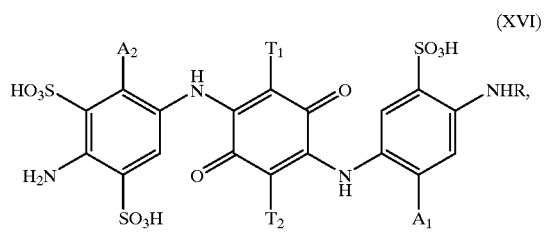
(XVI)

wherein, $T_1$, $T_2$, R, $A_1$ and $A_2$ have the same meaning as described above,
followed by a cyclization reaction. In some cases, the cyclization reaction may be conducted in the presence of an oxidizing agent.

The compound of the present invention has reactivity with fiber, and can be used for dyeing and printing of hydroxyl group-containing or carbonamide group-containing materials. The materials to be dyed or printed is preferably used as a fiber or a blended yarn thereof.

Examples of the hydroxyl group-containing material include natural or synthetic hydroxyl group-containing materials, such as cellulose fiber materials or their regenerated products and polyvinyl alcohol. As the cellulose fiber material, cotton, and other vegetable fiber, such as linen, flax, jute and ramie fiber are preferably used. Examples of the regenerated cellulose fiber include viscose staple and filament viscose.

Examples of the carbonamide group-containing material include synthetic and natural polyamides and polyurethanes, such as wool and other animal fur, silk, leather, polyamide-6,6, polyamide-6, polyamide-11 and polyamide-4.

The compound of the present invention can be dyed or printed on the above-described materials, particularly on the above-described fiber materials, by a method depending on physical and chemical properties and conditions.

When exhaustion dyeing is conducted on cellulose fiber, it is effected at relatively lower temperature, for example, in the presence of an acid binding agent such as sodium carbonate, sodium tertiary phosphate and sodium hydroxide, optionally with adding a neutral salt, such as sodium sulfate or sodium chloride, and if desired, with using a dissolving assistant, penetrating agent or level dyeing agent together. A neutral salt which promotes exhaustion of a dye can be added before or after dyeing temperature was attained, or optionally can be added in portions.

When cellulose fiber is dyed according to a padding method, padding and drying is conducted at room temperature or raised temperature, then, fixing can be conducted by steaming or dry-heating.

When cellulose fiber is printed, the printing is effected as follows:

the fiber is printed using a printing paste containing, for example, sodium bicarbonate or other acid binding agent in single phase, then steaming is conducted at 100 to 160° C.; or the fiber is printed using, for example, a neutral or weak acidic printing paste in two-phase, then it is passed through a hot electrolyte-containing alkaline bath or over-padding is conducted using an alkaline electrolyte-containing padding solution, and, thereafter, steaming or dry-heating is conducted.

In a printing paste, for example, a pasting agent or emulsifying agent such as sodium alginate or starch ether is used, optionally together with a usual printing aid such as urea and/or a dispersing agent.

The acid binding agent suitable for fixing the compound of the present invention on cellulose fiber is, for example, a water-soluble basic salt composed of an alkali metal or alkaline earth metal with an inorganic or organic acid or a compound liberating alkali at heated condition. Particularly, hydroxides of alkali metals, and alkali metal salts of inorganic or organic acids of weak to neutral strength are listed. Among them, sodium salts and potassium salts are particularly preferred. Examples of such acid binding agents include sodium hydroxide, potassium hydroxide, sodium bicarbonate, sodium carbonate, sodium formate, potassium carbonate, sodium primary, secondary or tertiary phosphate, sodium silicate and sodium trichloroacetate.

The dyeing of synthetic and natural polyamides and polyurethane fiber can be conducted by first exhausting in an acidic or a weak acidic dyeing bath under control of pH, then shifting pH to neutral, optionally alkaline for fixing. The dyeing can be usually conducted at a temperature from 60 to 120° C. Usual level dyeing agents for attaining level dyeing property, such as condensed compounds of cyanuric chloride with 3-fold molar aminobenzenesulfonic acid or aminonaphthalenesulfonic acid, and an addition product of stearylamine with ethylene oxide.

The compound of the present invention exhibits excellent ability in dyeing and printing a fiber material, and particularly, suitable for dying a cellulose fiber material, and shows excellent light fastness and perspiration-light fastness, excellent wet fastness, for example, washing resistance, peroxide-washing resistance, perspiration resistance, acid-hydrolysis resistance and alkali fastness, further, excellent chlorine fastness, NOx fastness, abrasion resistance and ironing resistance.

Also, they exhibit an excellent build-up property, leveling property and washing-off property and further a good solubility and exhaustion-fixing property. Further, they are less sensitive to variation of dyeing temperature or dyeing bath ratio and give a dyed product of stable quality.

Still further, they can provide a product which are less changeable in shade during the fixing treatment or resin treatment of the dyed product and less changeable by contact with a basic substance during storage.

Accordingly, the asymmetric dioxazine compounds of the present invention are practically useful.

EXAMPLES

The present invention will now be described in more specifically based on the following Examples. In Examples, parts and % mean parts by weight and % by weight, respectively.

Example 1

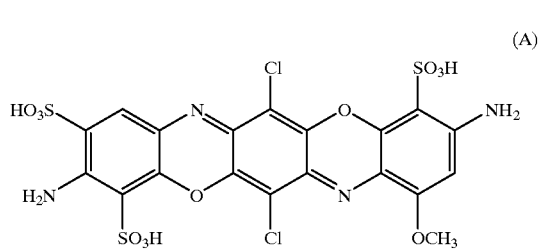

64.3 parts of a dioxadine base, the free acid of which being represented by the formula (A), was added to 1500 parts of water, and further, 19.4 parts of cyanuric chloride was added. The resulting mixture was stirred at pH 2 to 7 and a temperature from 5 to 30° C. until the completion of the reaction. After the completion of the reaction, the reaction mass was salted-out with potassium chloride to obtain an asymmetric dioxazine compound, the free acid of which being represented by the following formula.

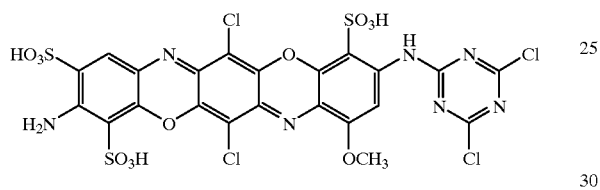

($\lambda$ max is 585 nm, providing in an aqueous medium. Hereinafter, the same.)

Example 2

To 1500 parts of water was added 72.3 parts of asymmetric dioxazine compound obtained in Example 1 and 4.2 parts of cyanamide. The resulting mixture was stirred at pH 3 to 9 and a temperature from 10 to 60° C. until the completion of the reaction. After the completion of the reaction, the reaction mass was salted-out with potassium chloride to obtain an asymmetric dioxazine compound, the free acid of which being represented by the following formula.

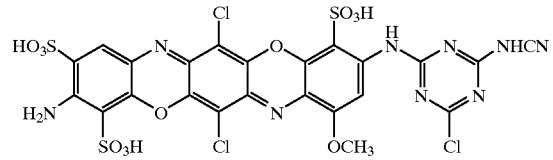

($\lambda$ max is 590 nm, providing in an aqueous medium.)

Example 3

To 1500 parts of water was added 65.5 parts of asymmetric dioxazine compound and 28.0 parts of the compound represented by the formula (1).

The resulting mixture was stirred at pH 1 to 4 and a temperature from 40 to 80° C. until the completion of the reaction. After the completion of the reaction, the reaction mass was salted-out with potassium chloride to obtain an asymmetric dioxazine compound, the free acid of which being represented by the following formula.

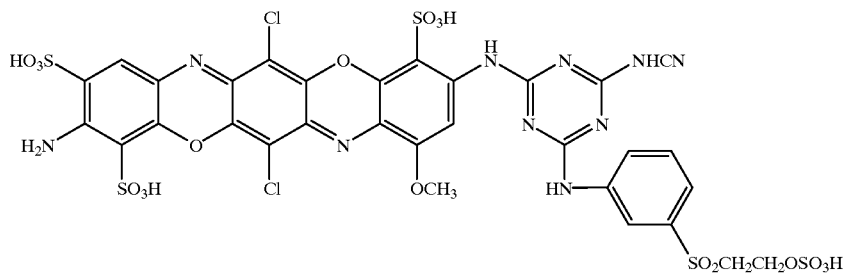

($\lambda$ max is 602 nm, providing in an aqueous medium.)

Cotton was dyed with the compound thus obtained to give a reddish blue dyed product.

Example 4

Using the asymmetric dioxazine compound obtained in Example 1 and a compound represented by the formula (1) and according to a usual method, a dioxazine compound, the free acid of which being represented by the formula (B), was obtained.

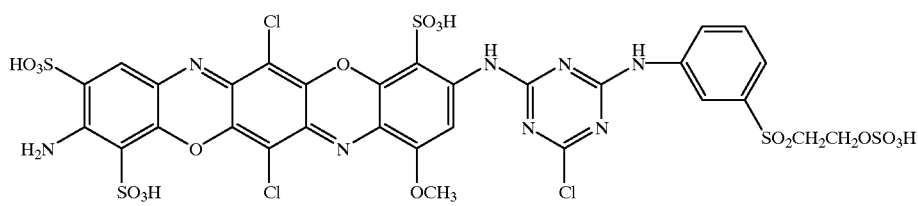

(B)

To 1500 parts of water was added 83.9 parts of the dioxazine compound thus obtained and 15.0 parts of nicotinic acid. The resulting mixture was stirred at pH 1 to 4 and a temperature from 40 to 80° C. until the completion of the reaction. After the completion of the reaction, the reaction mass was salted-out with potassium chloride to obtain an asymmetric dioxazine compound, the free acid of which being represented by the following formula.

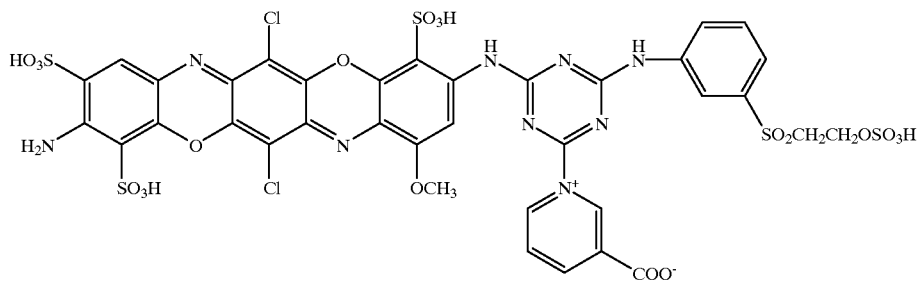

($\lambda$ max is 602 nm, providing in an aqueous medium.)

Cotton was dyed with the compound thus obtained to give a reddish blue dyed product.

Example 5–22

According to the same method as in Example 1 except that the dioxazine base represented by the formula (A) used in Example 1 and cyanuric chloride are replaced with the same molar of compounds shown in column 2 and column 3 in the following Table 1, respectively, the corresponding asymmetric dioxazine compound can be obtained. Dyeing cotton with the compound thus obtained, a reddish blue dyed product can be obtained.

TABLE 1

| Column 1 | Column 2 | Column 3 |
|---|---|---|
| 5 | (A) | (H) |
| 6 | ↑ | (I) |
| 7 | ↑ | (K) |
| 8 | ↑ | (L) |
| 9 | ↑ | (M) |
| 10 | ↑ | (N) |
| 11 | ↑ | (O) |
| 12 | ↑ | (R) |
| 13 | (C) | (H) |
| 14 | ↑ | (I) |
| 15 | ↑ | (J) |
| 16 | ↑ | (L) |
| 17 | ↑ | (M) |
| 18 | (D) | (H) |
| 19 | ↑ | (I) |
| 20 | (E) | (N) |

TABLE 1-continued

| Column 1 | Column 2 | Column 3 |
|---|---|---|
| 21 | (F) | (Q) |
| 22 | (G) | (P) |

(C)–(G) and (H)–(R) in column 2 and column 3 in Table 1 represent compounds of the following formulae.

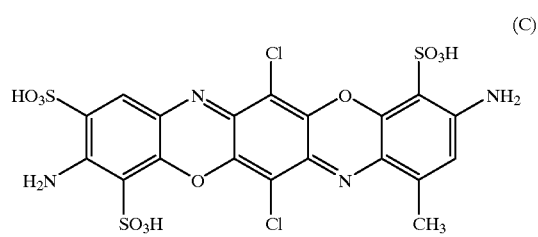

(C)

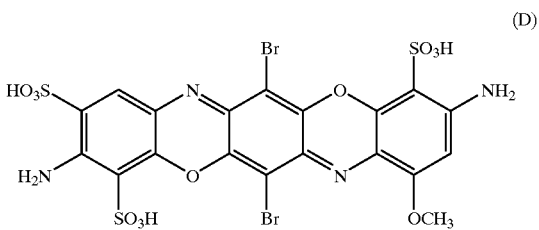

(D)

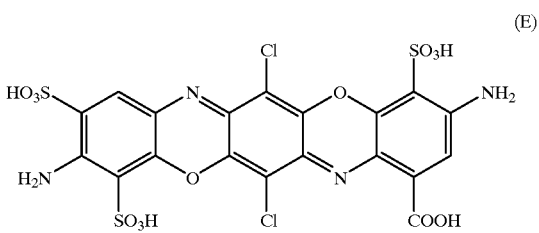

(E)

-continued

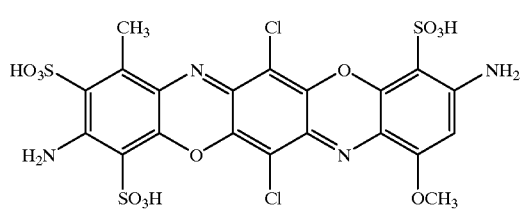 (F)

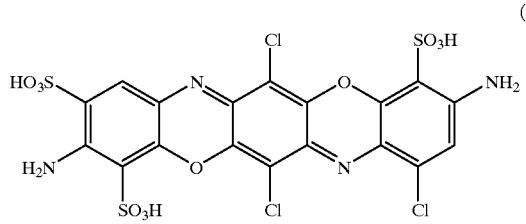 (G)

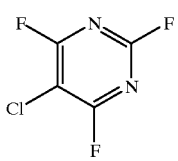 (H)

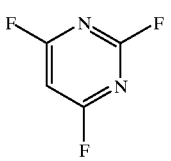 (I)

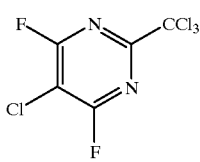 (J)

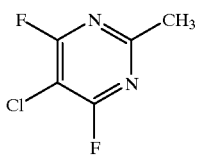 (K)

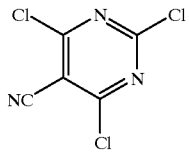 (L)

 (M)

-continued

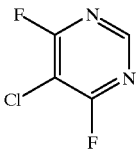 (N)

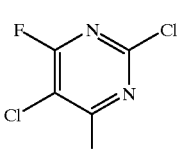 (O)

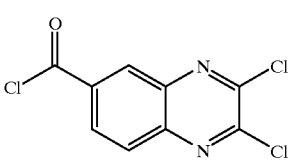 (P)

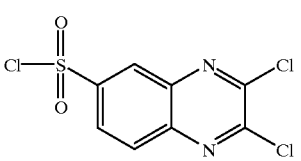 (Q)

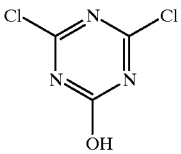 (R)

Example 23–41

According to the same method as in Example 1 and Example 2 except that the dioxazine base represented by the formula (A), cyanuric chloride and cyanamide are replaced with the same molar of compounds shown in column 2, column 3 and column 4 in the following Table 2, respectively, the corresponding asymmetric dioxazine compound can be obtained. Dyeing cotton with the compound thus obtained, a reddish blue dyed product can be obtained.

TABLE 2

| Column 1 | Column 2 | Column 3 | Column 4 |
|---|---|---|---|
| 23 | (A) | cyanuric fluoride | (2) |
| 24 | ↑ | cyanuric chloride | ↑ |
| 25 | ↑ | ↑ | (3) |
| 26 | ↑ | ↑ | (6) |
| 27 | ↑ | ↑ | (9) |
| 28 | ↑ | ↑ | (10) |
| 29 | (C) | ↑ | Cyanamide |
| 30 | ↑ | ↑ | (2) |
| 31 | ↑ | ↑ | (4) |
| 32 | ↑ | ↑ | (5) |
| 33 | ↑ | cyanuric fluoride | (7) |
| 34 | ↑ | ↑ | (8) |
| 35 | ↑ | cyanuric chloride | (14) |
| 36 | ↑ | ↑ | (15) |
| 37 | (D) | ↑ | (9) |
| 38 | ↑ | ↑ | (13) |

TABLE 2-continued

| Column 1 | Column 2 | Column 3 | Column 4 |
|----------|----------|----------|----------|
| 39 | (F) | cyanuric fluoride | (12) |
| 40 | (G) | cyanuric chloride | (10) |
| 41 | ↑ | ↑ | (11) |

(C)–(G) in column 2 in Table 2 represent compounds of the above-described formulae.

(2)–(15) in column 4 in Table 2 represent compounds of the following formulae.

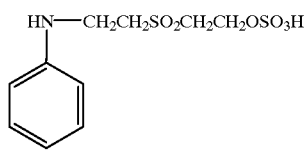
(2)

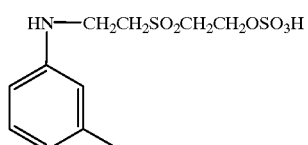
(3)

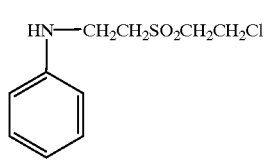
(4)

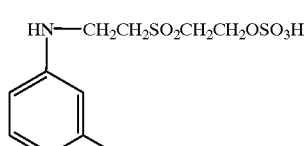
(5)

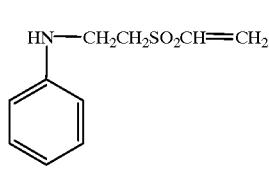
(6)

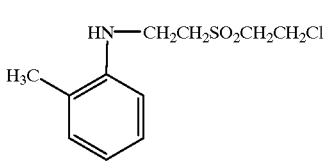
(7)

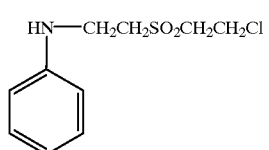
(8)

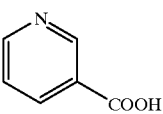
(9)

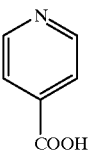
(10)

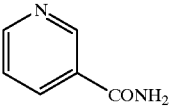
(11)

(12)

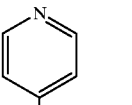
(13)

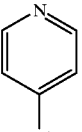
(14)

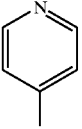
(15)

Example 42–206

According to the same method as in Example 2 and Example 3 except that the dioxazine base represented by the formula (A), cyanamide and the compound represented by the formula (1) are replaced with the same molar of compounds shown in column 2, column 3 and column 4 in the following Tables 3–10, respectively, the corresponding asymmetric dioxazine compound can be obtained. Provided that, when compounds of formula (66)–(75) are used, the intermediate wherein Z in formula (I) is —SO$_2$CH$_2$CH$_2$OH is salted-out with potassium chloride and dried, and the dried product is treated in concentrated sulfuric acid to obtain corresponding sulfate.

Dyeing cotton with the compound thus obtained, a reddish blue dyed product can be obtained.

TABLE 3

| Column 1 | Column 2 | Column 3 | Column 4 |
|---|---|---|---|
| 42 | (A) | cyanamide | (2) |
| 43 | ↑ | ↑ | (3) |
| 44 | ↑ | ↑ | (4) |
| 45 | ↑ | ↑ | (5) |
| 46 | ↑ | ↑ | (6) |
| 47 | ↑ | ↑ | (7) |
| 48 | ↑ | ↑ | (8) |
| 49 | ↑ | ↑ | (9) |
| 50 | ↑ | ↑ | (10) |
| 52 | ↑ | ↑ | (12) |
| 53 | ↑ | ↑ | (13) |
| 54 | ↑ | ↑ | (14) |
| 55 | ↑ | ↑ | (15) |
| 56 | ↑ | ↑ | (16) |
| 57 | ↑ | ↑ | (17) |
| 58 | ↑ | ↑ | (18) |
| 59 | ↑ | ↑ | (19) |
| 60 | ↑ | ↑ | (20) |

TABLE 4

| Column 1 | Column 2 | Column 3 | Column 4 |
|---|---|---|---|
| 61 | (A) | cyanamide | (21) |
| 62 | ↑ | ↑ | (22) |
| 63 | ↑ | ↑ | (23) |
| 64 | ↑ | ↑ | (24) |
| 65 | ↑ | ↑ | (25) |
| 66 | ↑ | ↑ | (26) |
| 67 | ↑ | ↑ | (27) |
| 68 | ↑ | ↑ | (66) |
| 69 | ↑ | ↑ | (67) |
| 70 | ↑ | ↑ | (68) |
| 71 | ↑ | ↑ | (69) |
| 72 | ↑ | (1) | (10) |
| 73 | ↑ | ↑ | (11) |
| 74 | ↑ | ↑ | (12) |
| 75 | ↑ | ↑ | (13) |
| 76 | ↑ | ↑ | (14) |
| 77 | ↑ | ↑ | (15) |
| 78 | ↑ | (2) | (1) |
| 79 | ↑ | ↑ | (2) |
| 80 | ↑ | ↑ | (3) |
| 81 | ↑ | ↑ | (9) |

TABLE 5

| Column 1 | Column 2 | Column 3 | Column 4 |
|---|---|---|---|
| 82 | (A) | (2) | (10) |
| 83 | ↑ | ↑ | (11) |
| 84 | ↑ | ↑ | (12) |
| 85 | ↑ | ↑ | (13) |
| 86 | ↑ | ↑ | (14) |
| 87 | ↑ | ↑ | (15) |
| 88 | ↑ | ↑ | (16) |
| 89 | ↑ | ↑ | (17) |
| 90 | ↑ | ↑ | (18) |
| 91 | ↑ | ↑ | (19) |
| 92 | ↑ | ↑ | (20) |
| 93 | ↑ | ↑ | (21) |
| 94 | ↑ | ↑ | (22) |
| 95 | ↑ | ↑ | (23) |
| 96 | ↑ | ↑ | (24) |
| 97 | ↑ | ↑ | (25) |
| 98 | ↑ | ↑ | (26) |
| 99 | ↑ | ↑ | (27) |
| 100 | ↑ | ↑ | (28) |
| 101 | ↑ | ↑ | (29) |
| 102 | ↑ | ↑ | (30) |

TABLE 6

| Column 1 | Column 2 | Column 3 | Column 4 |
|---|---|---|---|
| 103 | (A) | (2) | (31) |
| 104 | ↑ | ↑ | (32) |
| 105 | ↑ | ↑ | (33) |
| 106 | ↑ | ↑ | (34) |
| 107 | ↑ | ↑ | (35) |
| 108 | ↑ | ↑ | (36) |
| 109 | ↑ | ↑ | (37) |
| 110 | ↑ | ↑ | (38) |
| 111 | ↑ | ↑ | (39) |
| 112 | ↑ | ↑ | (40) |
| 113 | ↑ | ↑ | (41) |
| 114 | ↑ | ↑ | (42) |
| 115 | ↑ | ↑ | (43) |
| 116 | ↑ | ↑ | (44) |
| 117 | ↑ | ↑ | (45) |
| 118 | ↑ | ↑ | (46) |
| 119 | ↑ | ↑ | (47) |
| 120 | ↑ | ↑ | (48) |
| 121 | ↑ | ↑ | (49) |
| 122 | ↑ | ↑ | (50) |
| 123 | ↑ | ↑ | (51) |

TABLE 7

| Column 1 | Column 2 | Column 3 | Column 4 |
|---|---|---|---|
| 124 | (A) | (2) | (52) |
| 125 | ↑ | ↑ | (53) |
| 126 | ↑ | ↑ | (54) |
| 127 | ↑ | ↑ | (55) |
| 128 | ↑ | ↑ | (56) |
| 129 | ↑ | (3) | (1) |
| 130 | ↑ | ↑ | (6) |
| 131 | ↑ | ↑ | (9) |
| 132 | ↑ | ↑ | (16) |
| 133 | ↑ | ↑ | (18) |
| 134 | ↑ | ↑ | (25) |
| 135 | ↑ | ↑ | (31) |
| 136 | ↑ | ↑ | (36) |
| 137 | ↑ | ↑ | (43) |
| 138 | ↑ | ↑ | (47) |
| 138 | ↑ | ↑ | (51) |
| 140 | ↑ | ↑ | (54) |
| 141 | ↑ | (4) | (2) |
| 142 | ↑ | ↑ | (9) |
| 143 | ↑ | ↑ | (10) |
| 144 | ↑ | ↑ | (20) |

TABLE 8

| Column 1 | Column 2 | Column 3 | Column 4 |
|---|---|---|---|
| 145 | (A) | (4) | (37) |
| 146 | ↑ | (5) | (2) |
| 147 | ↑ | ↑ | (9) |
| 148 | ↑ | ↑ | (26) |
| 149 | ↑ | ↑ | (31) |
| 150 | ↑ | (6) | (1) |
| 151 | ↑ | ↑ | (2) |
| 152 | ↑ | ↑ | (9) |
| 153 | ↑ | ↑ | (10) |
| 154 | ↑ | ↑ | (17) |
| 155 | ↑ | (17) | (9) |
| 156 | ↑ | ↑ | (10) |
| 157 | ↑ | (18) | (9) |
| 158 | ↑ | (20) | ↑ |
| 159 | ↑ | (39) | (9) |
| 160 | ↑ | (57) | (1) |
| 161 | ↑ | (58) | (3) |
| 162 | ↑ | (64) | (10) |
| 163 | ↑ | (66) | (9) |
| 164 | ↑ | (67) | ↑ |
| 165 | ↑ | (68) | (11) |

TABLE 9

| Column 1 | Column 2 | Column 3 | Column 4 |
|---|---|---|---|
| 166 | (A) | (71) | (9) |
| 167 | ↑ | (72) | (3) |
| 168 | ↑ | (73) | (11) |
| 169 | ↑ | (74) | (22) |
| 170 | ↑ | (75) | (18) |
| 171 | (C) | cyanamide | (9) |
| 172 | ↑ | ↑ | (20) |
| 173 | ↑ | ↑ | (23) |
| 174 | ↑ | (1) | (9) |
| 175 | ↑ | (2) | (1) |
| 176 | ↑ | ↑ | (2) |
| 177 | ↑ | ↑ | (22) |
| 178 | ↑ | ↑ | (32) |
| 179 | ↑ | ↑ | (49) |
| 180 | ↑ | ↑ | (54) |
| 181 | ↑ | (3) | (16) |
| 182 | ↑ | ↑ | (47) |
| 183 | ↑ | (7) | (2) |
| 184 | ↑ | (19) | (10) |
| 185 | ↑ | (59) | (4) |
| 186 | ↑ | (65) | (6) |

TABLE 10

| Column 1 | Column 2 | Column 3 | Column 4 |
|---|---|---|---|
| 187 | (C) | (69) | (8) |
| 188 | (D) | cyanamide | (66) |
| 189 | ↑ | (2) | (14) |
| 190 | ↑ | ↑ | (23) |
| 191 | ↑ | (7) | (28) |
| 192 | ↑ | (8) | (2) |
| 193 | ↑ | ↑ | (51) |
| 194 | ↑ | (25) | (9) |
| 195 | ↑ | (60) | (9) |
| 196 | ↑ | (61) | (3) |
| 197 | ↑ | (63) | (3) |
| 198 | ↑ | (66) | (9) |
| 199 | (E) | cyanamide | (1) |
| 200 | ↑ | (2) | (48) |
| 201 | ↑ | (62) | (4) |
| 202 | (F) | (3) | (49) |
| 203 | ↑ | (6) | (10) |
| 204 | ↑ | (66) | (9) |
| 205 | (G) | cyanamide | (70) |
| 206 | (G) | (8) | (30) |

(A) and (C)–(G) in column 2 and (15) in column 2, column 3 and column 4 in Table 3–10 represent compounds of the above-described formulae.

(16)–(75) in column 3 and column 4 in Table 3–10 represent compounds of the following formulae.

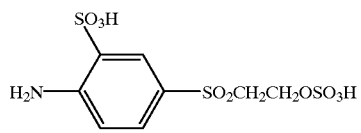

(16)

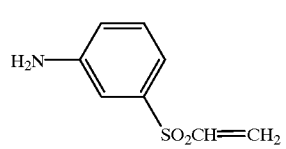

(17)

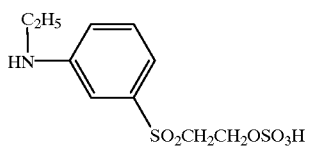

(18)

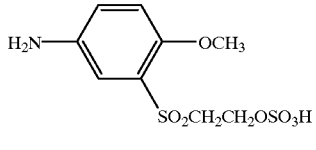

(19)

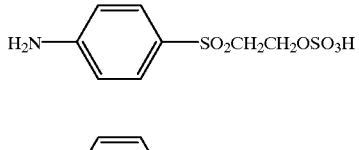

(20)

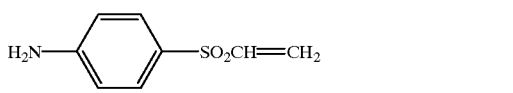

(21)

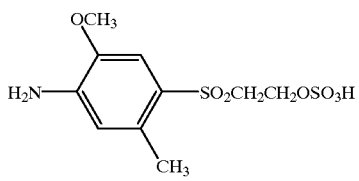

(22)

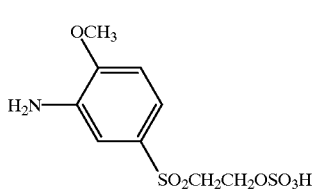

(23)

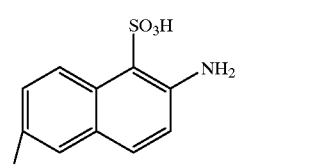

(24)

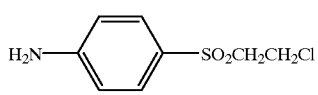

(26)

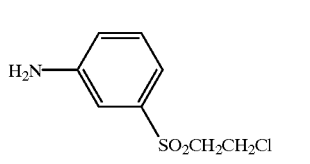

(27)

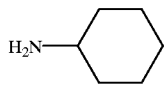

(28)

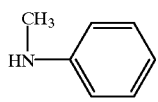 (29)
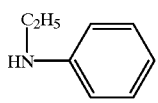 (30)
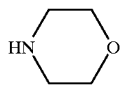 (31)
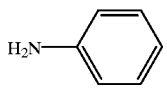 (32)
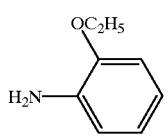 (33)
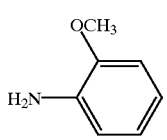 (34)
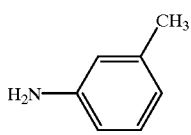 (35)
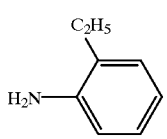 (36)
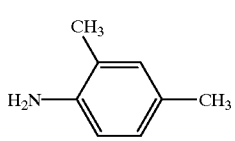 (37)
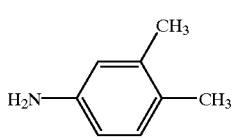 (38)
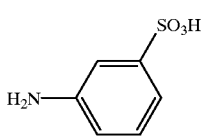 (39)
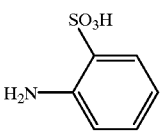 (40)
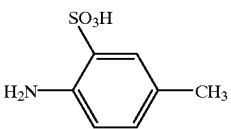 (41)
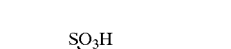 (42)
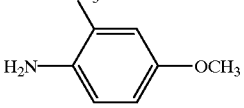 (43)
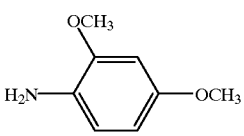 (44)
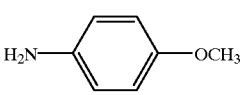 (45)
 (46)
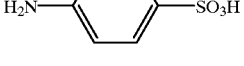 (47)
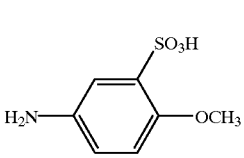 (48)
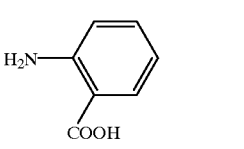 (49)
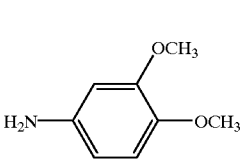 (50)

-continued

(51) 

(52)  H₂NCH₂CH₂SO₃H

(53) 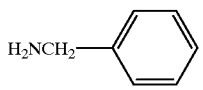

(54) 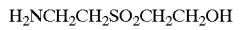 H₂NCH₂CH₂SO₂CH₂CH₂OH

(55)  H₂NCH₂CH₂CH₂SO₂CH₂CH₂OH

(56) 

(57)  H₂NCH₂CH₂OCH₂CH₂SO₂CH₂CH₂OH

(58)  HN(CH₂CH₂SO₂CH₂CH₂OH)₂

(59) 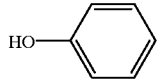

(60) 

(61) 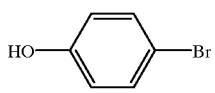

(62) 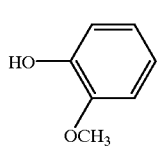

(63) Na₂SO₃

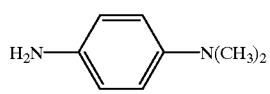 (51)

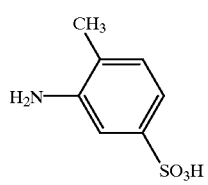 (52)

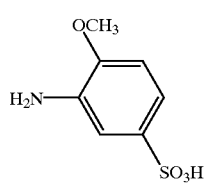 (53)

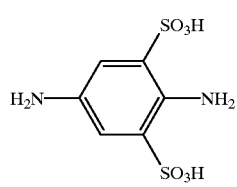 (54)

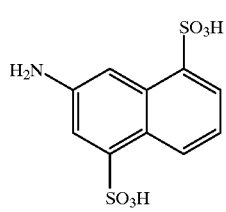 (55)

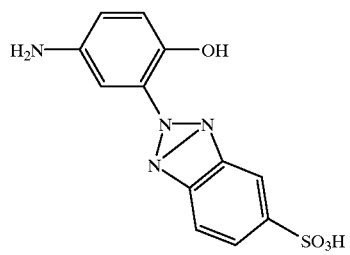 (56)

H₂NCH₂CH₂OH (57)

H₂NCH₃ (58)

H₂N(CH₃)₂ (59)

H₂N(C₂H₅)₂ (60)

H₂NCH₂CH₂CH₂CH₃ (61)

H₂NCH₂CH₂COOH (62)

Example 207

According to the same method as in Example 1 except that cyanuric chloride is replaced with the same molar of 2-methoxy-4,6-dichloro-1,3,5-triazine, the corresponding asymmetric dioxazine compound can be obtained.

Dyeing Example 1

Into each 200 parts of water were dissolved 0.1, 0.3 and 0.6 part of the asymmetric dioxazine compounds obtained in Examples 3 and 4, respectively. After adding 10 parts of sodium sulfate and 10 parts of cotton thereto, the temperature of the mixture was elevated to 60° C. and dyeing was carried out at the same temperature for 1 hour with addition of 4 parts of sodium carbonate. Then, the cotton was washed with water, soaped, washed with water and dried to give a dyed product of reddish blue which was excellent in various fastness and had a good build-up property.

Dyeing Example 2

Into each 200 parts of water were dissolved 0.1, 0.3 and 0.6 part of the asymmetric dioxazine compounds obtained in Examples 3 and 4, respectively. After adding 6 parts of sodium sulfate and 10 parts of cotton thereto, the temperature of the mixture was elevated to 70° C. and dyeing was carried out at the same temperature for 1 hour with addition of 4 parts of sodium carbonate. Then, the cotton was washed with water, soaped, washed with water and dried to give a dyed product of reddish blue which was excellent in various fastness and had a good build-up property.

What we claim is:

1. An asymmetric dioxazine compound represented by the following formula (I):

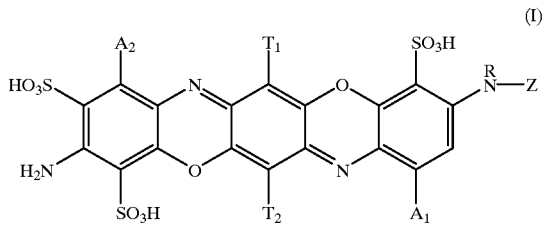

(I)

wherein, $T_1$ and $T_2$ each independently represents hydrogen, chlorine, bromine, a lower alkyl group, a lower alkoxy group or a phenoxy group;

$A_1$ represents a lower alkyl group, a lower alkoxy group, chlorine, bromine or a carboxyl group;

$A_2$ represents hydrogen, a lower alkyl group, a lower alkoxy group, chlorine, bromine or a carboxyl group;

R represents hydrogen or a lower alkyl group which may be optionally substituted; and Z represents a pyrimidine-based or quinoxaline-based fiber reactive group, or a triazine-based fiber reactive group selected from groups represented by the following formulae(II) to (V):

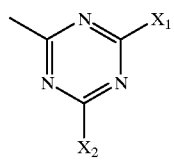

(II)

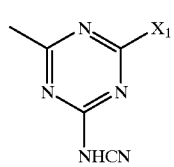

(III)

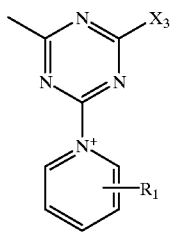

(IV)

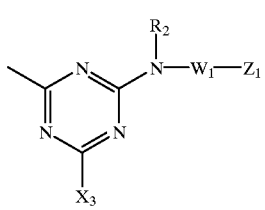

(V)

wherein, $X_1$ represents halogen or a group represented by the following formula (VI):

$$-N(R_3)-W_2-Z_2 \quad (VI)$$

wherein, $W_2$ represents a lower alkylene group which may be optionally substituted and may be interrupted by a hetero atom, a phenylene group which may be optionally substituted or a naphthylene group which may be optionally substituted;

$Z_2$ represents $-SO_2-CH=CH_2$ or $-SO_2CH_2CH_2Z_2'$ ($Z_2'$ represents a group which is released by the action of an alkali); and $R_3$ represents hydrogen or a lower alkyl group which may be optionally substituted;

$X_2$ represents SH, $SR_4$, $SO_2R_4$ ($R_4$ represents a lower alkyl group which may be optionally substituted or a phenyl group which may be optionally substituted) or $SO_3H$, provided that, when $X_1$ represents a group represented by the formula (VI), $X_2$ represents SH, $SR_4$, $SO_2R_4$ ($R_4$ has the same meaning as described above), $SO_3H$ or a phenoxy group which may be optionally substituted;

$R_1$ represents hydrogen, a carboxyl group, a carbamoyl group, a sulfo group, halogen or a lower alkyl group which may be optionally substituted;

$W_1$ represents a lower alkylene group which may be optionally substituted and may be interrupted by a hetero atom;

$R_2$ represents a phenyl group which may be optionally substituted or $-W_3-Z_3$ {$W_3$ represents a lower alkylene group which may be optionally substituted and may be interrupted by a hetero atom, $Z_3$ represents $-SO_2-CH=CH_2$ or $-SO_2CH_2CH_2Z_3'$ ($Z_3'$ represents a group which is released by the action of an alkali)};

$Z_1$ represents $-SO_2-CH=CH_2$ or $-SO_2-CH_2CH_2Z_1'$ ($Z_1'$ represents a group which is released by the action of an alkali); and $X_3$ represents halogen, OH, $OR_4$, SH, $SR_4$, $SO_2R_4$ ($R_4$ has the same meaning as described above), $SO_3H$, an amino group selected from alkyl(C1 to C6)amino, N,N-dialkyl(C1 to C6)amino, cycloalkyl(C5 to C7)amino, aralkyl(C7 to C10)amino, aryl(C6 to C12)

amino, N-alkyl(C1 to C6)-N-cyclohexylamino, N-alkyl (C1 to C6)-N-aralkyl(C7 to C10)amino, N-alkyl(C1 to C6)-N-aryl(C6 to C12)amino, amino groups substituted by an aryl group which is substituted by a heterocyclic group, and amino groups of which amino nitrogen atom is a ring member of an N-heterocyclic ring, wherein the aryl group and N-heterocyclic ring contained in the amino group may be optionally substituted by one, two or three substituants selected from halogen, nitro, cyano, trifluoromethyl, sulfamoyl, carbamoyl, C1 to C4 alkyl, C1 to C4 alkoxy, alkyl(C1 to C4)carbonylamino, ureido, hydroxy, carboxy, sulfomethyl, β-hydroxyethylsulfonylethyloxy, dimethylamino and sulfo, or a group represented by the following formula (VII):

—N($R_5$)—$W_4$—$Z_4$ (VII)

wherein, $W_4$ represents a lower alkylene group which may be optionally substituted and may be interrupted by a hetero atom, a phenylene group which may be optionally substituted or a naphthylene group which may be optionally substituted; $Z_4$ represents —$SO_2$—CH=$CH_2$ or —$SO_2CH_2CH_2Z_4'$ ($Z_4'$ represents a group which is released by the action of an alkali); and $R_5$ represents hydrogen, a lower alkyl group which may be optionally substituted, a phenyl group which may be optionally substituted or —$W_5Z_5$ {$W_5$ represents a lower alkylene group which may be optionally substituted and may be interrupted by a hetero atom, and $Z_5$ represents —$SO_2$—CH=$CH_2$ or —$SO_2$—$CH_2CH_2Z_5'$ ($Z_5'$ represents a group which is released by the action of an alkali)}; provided that, when $R_1$ represents a carboxyl group, $R_5$ is not a lower alkyl group which may be optionally substituted; and a salt thereof.

2. The asymmetric dioxazine compound according to claim 1, wherein $T_1$ and $T_2$ are chlorine or bromine.

3. The asymmetric dioxazine compound according to claim 1, wherein R is hydrogen.

4. The asymmetric dioxazine compound according to claim 1, wherein $A_2$ is hydrogen.

5. The asymmetric dioxazine compound according to claim 1, wherein $A_1$ is a lower alkyl group or a lower alkoxy group.

6. The asymmetric dioxazine compound according to claim 1, wherein Z is a fiber reactive group represented by the formulae (III) or (IV).

7. The asymmetric dioxazine compound and a salt thereof according to claim 1, wherein Z is a pyrimidine-based or quinoxaline-based fiber reactive group.

8. The asymmetric dioxazine compound and a salt thereof according to claim 1, wherein Z is a triazine-based fiber reactive group represented by the formula (II).

9. The asymmetric dioxazine compound and a salt thereof according to claim 1, wherein Z is a triazine-based fiber reactive group represented by the formula (III).

10. The asymmetric dioxazine compound and a salt thereof according to claim 1, wherein Z is a triazine-based fiber reactive group represented by the formula (IV).

11. The asymmetric dioxazine compound and a salt thereof according to claim 1, wherein Z is a triazine-based fiber reactive group represented by the formula (V).

12. A method for dyeing or printing a fiber material which comprises applying the asymmetric dioxazine compound according to claim 1 to the fiber material.

* * * * *